US012003033B2

(12) United States Patent
Manser et al.

(10) Patent No.: US 12,003,033 B2
(45) Date of Patent: Jun. 4, 2024

(54) ANTENNA MODULE WITH BOARD CONNECTOR

(71) Applicant: HUBER+SUHNER AG, Herisau (CH)

(72) Inventors: Franz Manser, Herisau (CH); Ulf Hügel, Herisau (CH)

(73) Assignee: HUBER+SUHNER AG, Herisau (CH)

( * ) Notice: Subject to any disclaimer, the term of this patent is extended or adjusted under 35 U.S.C. 154(b) by 236 days.

(21) Appl. No.: 17/614,979

(22) PCT Filed: Jun. 17, 2020

(86) PCT No.: PCT/EP2020/066751

§ 371 (c)(1),
(2) Date: Nov. 29, 2021

(87) PCT Pub. No.: WO2020/254397

PCT Pub. Date: Dec. 24, 2020

(65) Prior Publication Data

US 2022/0239016 A1 Jul. 28, 2022

(30) Foreign Application Priority Data

Jun. 20, 2019 (CH) .................................... 00834/19

(51) Int. Cl.
*H01Q 9/16* (2006.01)
*H01Q 1/24* (2006.01)
(Continued)

(52) U.S. Cl.
CPC ............. *H01Q 21/26* (2013.01); *H01Q 1/246* (2013.01); *H01Q 1/38* (2013.01); *H01Q 1/50* (2013.01); *H01Q 1/526* (2013.01); *H01Q 17/00* (2013.01)

(58) Field of Classification Search
CPC ............ H01Q 1/246; H01Q 1/24; H01Q 1/38; H01Q 1/50; H01Q 1/52; H01Q 1/526; H01Q 9/16; H01Q 17/00; H01Q 21/26
See application file for complete search history.

(56) References Cited

U.S. PATENT DOCUMENTS 7,679,576 B2 * 3/2010 Riedel .................... H01Q 1/246 343/810
8,134,506 B2 * 3/2012 Leisten ................ H01Q 9/0485 343/702
(Continued)

FOREIGN PATENT DOCUMENTS

CN 105490003 A 4/2016
EP 1 102 347 A2 5/2001
(Continued)

OTHER PUBLICATIONS

EPO (Riswijk, NL), English language version of the International Search Report, Form PCT/ISA/210, for International Application PCT/EP2020/066751, dated Sep. 16, 2020 (3 pages).
(Continued)

*Primary Examiner* — Tho G Phan
(74) *Attorney, Agent, or Firm* — Pauley Erickson & Swanson

(57) ABSTRACT

An antenna module (1) with a number of antennas (11). Each antenna (11) includes a number of antenna elements and a number of elongated antenna contact elements (112). The antenna contact elements (112) are each configured to establish contact with an associated conductive path of a printed circuit board (2) via a movement of the antennas (11) and the printed circuit board (2) towards each other. The antenna module further includes a shielding with a shielding frame (12) and a shielding cover (15). The shielding frame (12) has a proximal shielding frame end that is configured for mounting on the printed circuit board (2) under circumferential
(Continued)

contact. The shielding cover is in circumferential contact with the shielding frame (12). The shielding carrying the number of antennas (11, 11').

18 Claims, 10 Drawing Sheets

(51) Int. Cl.

| | |
|---|---|
| ***H01Q 1/38*** | (2006.01) |
| ***H01Q 1/50*** | (2006.01) |
| ***H01Q 1/52*** | (2006.01) |
| ***H01Q 17/00*** | (2006.01) |
| ***H01Q 21/26*** | (2006.01) |

(56) References Cited

U.S. PATENT DOCUMENTS

| | | | |
|---|---|---|---|
| 11,283,194 B2 * | 3/2022 | Li .......................... | H01Q 21/26 |
| 2008/0111757 A1 | 5/2008 | Bisiules et al. | |
| 2010/0182213 A1 | 7/2010 | Obermaier et al. | |
| 2018/0115051 A1 | 4/2018 | Nguyen | |
| 2018/0337462 A1 | 11/2018 | Vollmer et al. | |

FOREIGN PATENT DOCUMENTS

| | | |
|---|---|---|
| EP | 3 236 531 A1 | 10/2017 |
| EP | 3 367 499 A1 | 8/2018 |
| JP | 2003133825 A | 5/2003 |
| TW | 200729609 A | 8/2007 |
| WO | WO 2018/218515 A1 | 6/2018 |
| WO | WO 2019/072390 A1 | 4/2019 |

OTHER PUBLICATIONS

China Patent Office, English language version of the Office Action for China Application No. 202080043453.6, dated Dec. 26, 2023 (12 pages).

* cited by examiner

ANTENNA MODULE WITH BOARD CONNECTOR

CROSS REFERENCE TO RELATED APPLICATION

This application is a National Phase filing in the United States, under 35 USC § 371, of PCT International Patent Application PCT/EP2020/066751, filed on 17 Jun. 2020 which claims the priority of Swiss Patent Application CH 00834/19, filed 20 Jun. 2019.

These applications are hereby incorporated by reference herein in their entirety and is made a part hereof, including but not limited to those portions which specifically appear hereinafter.

BACKGROUND OF THE INVENTION

Field of the Invention

The present invention relates to the field of antennas and antenna modules, high-frequency assemblies, methods for assembling high-frequency assemblies as well as methods for transmitting and/or receiving high-frequency signals. The invention is particularly useful in antenna arrangements with a high number of transmitting/receiving elements in compact arrangement as used in telecommunication.

Discussion of Related Art

The evolution in mobile communication systems (e.g. according to the "5G" standard) needs to increase spectrum efficiency for signal transmission over the air. One key element is the introduction of massive mimo (multiple in multiple out) antenna systems. The used antenna arrangements may have multiple antennas that receive and transmit in the same channel respectively frequency, but are individually controlled in phase and amplitude. Thereby, adaptive beamforming is enabled even in a complex dynamic environment, where multiple obstacles with different absorbing and reflecting surfaces may be present.

Furthermore, base station antennas are limited in size, weight and acceptable visual impact. So the required large number of single antennas per channel makes it highly desirable to arranged antenna arrangements for different frequency bands in common instead of having separate antennas per frequency band or channel.

SUMMARY OF THE INVENTION

Today, mimo antenna architecture use a digital printed circuit board (PCB) where all signal processing is located and for each individual radiator respectively antenna element is arranged as close as possible to the radiator respectively antenna element to minimize signal transmission losses. With the huge amount of signal processing and the colocation of typically tens of transceivers, a careful shielding concept is required, including several metal shielding compartments that need to be conductive attached to this board. Where signals need to be feed-trough of the metal shielding compartments with board-to-board connectors, additional electromagnetic shielding is required in order to not compromise the electromagnetic compatibility.

The antenna elements are typically arranged on a RF (radio-frequency) PCB which is responsible to interconnect the radiating elements, in existing base station antenna arrangements where one transceiver is connected to several antenna elements, the signal connectivity and distribution function of the RF-PCB as described above resulted in a simplification as compared to other antenna topologies were individual coaxial cables are used for this functionality. Between this digital PCB and RF-PCB, the RF signal is transmitted by board-to-board interconnectors which are capable to compensate the misalignment tolerances within this architecture. In dependence of the used duplex scheme, additional filters, duplexers or isolator elements may be located between the digital PCB and the RF-PCB (resulting in a need for additional board to module interconnectors), or may be located on one of these boards.

A disadvantage of the before-described architecture is that each combination of frequency bands, duplex schema and antenna size restrictions requires an individual design of at least two boards with all individual shielding boxes, fixtures and interconnections.

It is an overall objective of the present invention to generally improve the state of the art regarding antenna arrangements. Favorably, one or more of the drawbacks of known arrangements is avoided fully or partly. Favorably, an architecture is provided that allows a modularized approach to realize massive mimo antennas in customizable dimensions and combination of frequency bands. The invention, however, is also useful in arrangement with only a few antennas or even a single antenna.

According to a first aspect, the overall objective is achieved via an antenna module. The antenna module comprises a number of antennas. Each antenna comprises a number of antenna elements and a number of elongated antenna contact elements. Each antenna contact element has a proximal antenna contact element end and an opposed distal antenna contact element end. The distal antenna contact element ends are each connected to at least one antenna element.

In some embodiments, the number of antenna elements corresponds to the number of antenna contact elements. In such embodiments, each antenna contact element may be connected with an associated antenna contact element in a one-to-one configuration. In other embodiments, however, the number of antenna elements is different from the number of antenna contact elements. In particular, the number of antenna contact elements may be larger than the number of antenna elements and different antenna contact elements may contact the same antenna element at different positions. By way of example, the number of antenna elements may be one, i.e., the antenna comprises a single antenna element, and four antenna contact elements are connected to the antenna contact element at different positions.

The antenna contact elements are each configured to establish contact with an associated conductive path of a printed circuit board via a movement of the antennas and the printed circuit board towards each other. The printed circuit board is generally identical for all antenna contact elements. The antenna contact elements extend from the antenna elements in generally proximal direction. For establishing the contact with the printed circuit board respectively the conductive paths as explained further below, the antenna contact elements each have an antenna contact element coupling area at or in proximity of the proximal antenna contact element end.

As will be discussed further below, the contact between an antenna contact elements and the associated conductive path may be a direct contact or may be an indirect contact via printed circuit board contact element that is arranged and typically soldered onto the printed circuit board.

The antenna module further includes a shielding, the shielding including a shielding cover and a shielding frame as structurally distinct components. The shielding frame has a proximal shielding frame end and an opposed distal shielding frame end. The proximal shielding frame end is configured for mounting on the printed circuit board under circumferential contact. The shielding frame is further configured to circumferentially enclose components of an antenna interface circuit arranged on the printed circuit board. The printed circuit board on which the shielding frame is mounted and that carries the components of the antenna interface circuit is generally the same as the printed circuit board that contacts the antenna contact elements.

The shielding cover is in circumferential contact with a circumferential surface of the shielding frame. Like the shielding frame, the shielding cover is made from conductive material and may for example be a press-bent sheet metal part.

The shielding cover may be in circumferential contact with an inner surface of the shielding frame. In such embodiment, the shielding cover is received inside the shielding frame and this type of embodiment is generally assumed in the following. In further embodiments, the shielding cover is in circumferential contact with an outer surface of the shielding frame and/or the circumferential top surface at the distal shielding frame end. In such embodiment, the shielding cover may be put over the distal end of the shielding frame.

The shielding frame is favorably arranged traverse to the walls of the shielding frame (normal to the longitudinal axis) and in some distance to the proximal shielding frame end. In an assembled configuration, the shielding cover is accordingly arranged parallel to the printed circuit board with the components of the antenna interface circuit being arranged in the space between the printed circuit board and the shielding cover. For ensuring good galvanic contact between the shielding frame and the shielding cover, the shielding cover may comprise resilient respectively elastic shielding cover springs around its circumference. Further in an assembled configuration, the shielding frame, the shielding cover and the printed circuit board delimit, in combination, a space in which the components of the antenna interface circuit are arranged. If appropriate, further conductive walls may be arranged within the shieling frame, thereby separating the shielding frame into a number of compartments.

The shielding further carries the number of antennas as will be described further below. The antennas may be carried by the shielding via an insulating connection respectively coupling without electric contact between the shielding and the antenna element close to the antenna contact element. Alternatively depending on the radiator type the antenna element could directly be attached to the shielding, forming an electrical contact in a dedicate distance (e.g. quarter wavelength)

The expressions "proximal" and "distal" generally refer to opposite directions along a longitudinal axis. In combination with a printed circuit board to which the antenna module is mounted, the printed circuit board is most proximal, while one or more antennas are most distal. The distal direction is accordingly a direction towards the antenna or antennas, while the proximal direction is a direction towards the printed circuit board. The expression "lateral" refers to a direction traverse to the longitudinal axis, respectively parallel to the printed circuit board. The terms "inwards" and "outwards" are used with reference to the longitudinal axis. Generally, the longitudinal axis extends through a center of the antenna or antennas and the center of the shielding frame in a viewing direction along the longitudinal axis. The longitudinal axis further defines an assembly direction as explained further below in more detail. The outer contour of an element in a viewing direction along the longitudinal axis is also referred to as footprint.

The expression "antenna element" refers to a component of an antenna module via which electromagnetic/high-frequency signals are transmitted and/or received. The expression "antenna contact element" refers to an element that is used for electric coupling an antenna element to further components or circuitry, in particular a printed circuit board (PCB). An antenna is formed by a number of antenna elements and a number of antenna contact elements. The antenna elements of an antenna are generally operated and controlled in a defined way with identical frequency to obtain a desired and defined transmission and/or receiving characteristic. The antenna elements may include planer printed circuit board elements, 3D-metalized polymer elements, sheet metal elements, die-casted structures or a combination of those. If appropriate, they may also comprise more complex structures such including lenses, directors, reflectors, or shields. As mentioned before, the number of antenna contact elements may or may not correspond to the number of antenna elements.

The connection of an antenna contact element with the associated antenna element and conductive path on the printed circuit board includes a galvanic electrical contact but may also include a mechanical coupling. The mounting of the shielding frame on the printed circuit board generally established both a mechanical and an electrical contact. The circumferential contact between the shielding cover and the shielding frame is generally both a mechanical and electrical contact.

As will be discussed in more detail further below, an antenna module may have a single antenna or a number of more than one, e. g. 2 antennas.

In some embodiments, the number of antenna elements and antenna contact elements in an antenna 1, that is, a single antenna element is present as transmitting and/or receiving element. In other embodiments, the number of antenna elements is larger than 1 and, for example, 2, 4, or 8. In general, the term "number" in the present document may refer to any natural number, starting with 1. In this context, it is noted that the use of the plural form, e. g. "antennas". "antenna elements", antenna contact elements", is to be understood as also including the singular form, e. g. "antenna", antenna element", antenna contact element".

Further in some embodiments that are generally assumed in the following, the antenna elements of an antenna are planar and extend in a common plane. In embodiments of the antenna module with more than 1 antenna, the single antennas may extend in a common plane or may extend in different planes each or in groups. For such type of embodiment, the antennas may define a number of planes that are for example parallel to each other and traverse to the longitudinal axis.

The contact that is established between an antenna contact element and an associated conductive path of the printed circuit board is not soldered, but is an electric and mechanical coupling based on a spring force that acts between the antenna contact element and a printed circuit board contact element mounted on the printed circuit board or directly the conductive path respectively a contact area that is printed on the printed circuit board. In dependence of the design, the spring force may be generally axial (aligned with the longitudinal axis), traverse to the longitudinal axis, or a combination thereof). In some embodiments, the spring force results from deflection of the antenna contact element and/or the printed circuit board contact element.

In typical embodiments, all antenna contact elements extend form the antenna elements by the same distance in the proximal direction respectively have the proximal antenna contact element ends and/or antenna contact element coupling areas in a common plane traverse to the longitudinal axis respectively parallel to the printed circuit board in an assembled configuration. For such embodiment, electrical contact with the associated conductive paths of the printed circuit board is established substantially simultaneously when moving the printed circuit board and the antenna towards each other in the assembly process.

Optionally, the coupling area of the antenna contact elements and/or of printed circuit board contact elements that are arranged on the printed circuit board may have a structure to improve a reliable electric contact, for example by bulges or embossments. Releasable or non-releasable interlocking features may optionally be present.

The relative movement of the antenna and the printed circuit board towards each other in the assembly is typically a linear movement along the longitudinal axis. For an embodiment with more than one antenna, the movement for establishing the coupling as explained before is a generally a common movement. However, different antennas of an antenna module may also be assembled sequentially.

The antenna or antennas may be designed and operated according to different basic principles as generally known in the art. Typically, but not necessarily, the one or more antennas of the antenna module include pairs of cross polarized radiators respectively antenna elements. In some embodiments, two of such pairs of antenna elements (dipoles) are present in antenna and centered in the middle of the module as defined by the longitudinal axis. Antenna elements may be connected to the antenna interface circuit as differentially as pair (balanced), coaxially single ended with a signal conductor and a ground conductor, or single ended with a signal conductor without ground conductor. By way of example, a triple band module may include 6 crossed dipole antennas feed by either six single ended or 12 balanced signal lines. It is noted that a dipole is not necessarily realized by structurally distinct antenna elements. Instead, a common antenna element with a number of antenna contact elements may be present. By providing appropriate control signals to the antenna contact elements, a desired characteristic may be obtained.

In some embodiments, at least one antenna contact element is formed integrally with an antenna element. In some of those embodiments, all antenna contact elements of an antenna contact elements are formed integrally with one or more antenna elements. In an embodiment where each antenna contact element is associated with a corresponding antenna element in a one-to-one manner, each antenna contact element may be formed integrally with the associated antenna element. This kind of embodiment allows an efficient manufacture of antennas for example from sheet metal as press-bent parts. Dependent on the overall design and frequency, each antenna element and associated antenna contact element may be an individual component, or some or all of the antenna elements and associated antenna contact elements of an antenna may be made manufactured as a common component and accordingly be formed integral with each other. The desired characteristic of an antenna of the latter type is controlled via a defined phase of the signals fed to the single antenna elements from the antenna interface circuit.

In some embodiments, the antenna contact elements of an antenna are designed as tongues. Such tongs are generally designed as parallel stripes with a length that is considerably larger as compared to their width. This design is particularly favorable with respect to manufacture and assembly. Other designs, however, may be used as well in dependence on the overall design of the antenna module.

In some embodiments, the antenna module includes a coupling member. The shielding frame and/or the shielding cover is connected to the coupling member and the coupling member is connected to the antennas. The coupling member may be a dedicated component or may be formed integrally with a component of the shielding, in particular the shielding cover, and/or the antenna. The connection between the shielding and the coupling member as well as the connection between the coupling member and the antennas is a mechanical connection with or without electrical contact. The coupling member may be connected to antenna elements and/or antenna contact elements of an antenna. The coupling member is made from dielectric respectively insulating material, for example plastics, or may be made fully or partly from metal. This is particularly the case where carrier member is formed integrally with the antenna and/or the shielding.

The following description is mainly based on embodiments with a single coupling member that is connected with all antennas. In alternative embodiments, however, the coupling member may be structurally split into a number of insulation elements that are each associated with one or a number of antennas and/or antenna contact elements. In some embodiments, a separate coupling member may be present in some embodiments for each antenna contact element.

Both the coupling of the coupling member and the shielding as well as the coupling between the antenna contact elements and the printed circuit board respectively printed circuit board contact elements may be releasable or non-releasable. In the first case, the antennas may be replaced as desired, e. g. for a change in application or repair purposes.

In some embodiments, at least one antenna contact element is fed through an associated coupling member aperture of the coupling member. In a particular embodiment, the coupling member comprises, for one, some or all antennas of the antenna module, a number of coupling member apertures corresponding to the number of antenna contact elements. Each antenna contact element is fed through an associated coupling member aperture. In such embodiment, coupling member apertures may be used to position and align the antenna contact elements via their defined relative positions. In other embodiments, other type of positioning features, such as positioning pins and/or notches or grooves may be foreseen.

In some embodiments, the coupling member is at least partly received by the shielding frame at the distal shielding frame end. Further for such embodiment, the coupling member is circumferentially surrounded by the shielding frame. Here, the lateral relative positioning of the coupling member with respect to the shielding frame is realized via the circumferential contact. The contact between the coupling member and the shielding frame may be on the whole circumference, which however, is not essential. The coupling member may form a cover that is arranged distal of the shielding cover. As described further below, the coupling member may in some embodiments include an antenna carrier. In alternative embodiments, the coupling member may be put over the shielding frame at its distal end.

In some embodiments with a coupling member, the shielding frame and the coupling member are connected via snap-fit. Snap-fit features, such as a catch-latch arrangement, may be provided at the coupling member and/or the shielding frame. By way of example, elastic latch members may be provided that extend from the distal shielding frame end in distal direction and are distributed around its circumference. Snap-fitting is achieved via the latch members engaging the coupling member during the assembly process. The coupling that is realized via the snap-fit may be designed releasable or non-releasable.

In some embodiments, the antenna module includes an antenna carrier. The antenna carrier may be a dedicated component or may be formed integrally with and/or be integral with a coupling as described before. In some embodiments, the coupling member has a proximal antenna carrier end and an opposed distal antenna carrier end. The proximal antenna carrier end may be formed as coupling member. The antenna carrier extends from the shielding frame distal end. The antenna carrier serves the purpose of mechanically carrying and/or supporting the antenna members. The antenna carrier may in some embodiments further electrically insulate antenna elements and/or antenna contact elements with respect to each other. Providing an antenna carrier results in a mechanically robust arrangement that is favorable with respect to handling and assembly.

In some embodiments, an antenna carrier may extend from the coupling member in distal direction. The antenna carrier may, for example, have a square or cross shaped cross section and may be solid or hollow. Typically, all antenna elements of an antenna are carried by the antenna carrier.

In some embodiments, an antenna support may be present alternatively or additionally. In some embodiments, an antenna support may be designed as ring and receive antenna elements in a circumferential groove. The antenna support may in some embodiments be carried and supported together with the antenna elements by the antenna contact elements.

In some embodiments, a number of antenna contact elements extends through the shielding cover into a space that is delimited by the shielding frame and the shielding cover. The proximal antenna contact element ends are surrounded by the frame. In an assembled configuration, the proximal antenna contact element ends are further positioned between the printed circuit board and the shielding frame cover. In some embodiments, this may be the case for more than one antenna contact element and in particular all antenna contact element of an antenna.

In some embodiments, the shielding cover comprises a number of shielding cover apertures and a number of antenna contact elements extends through the shielding cover apertures. In some embodiments, the number of shielding cover apertures corresponds to the number of antenna contact elements, with each antenna contact element extending to a separate associated shielding cover aperture. In further embodiments, more than one antenna contact element, for example two antenna contact elements, extend through a common shielding cover aperture. In such embodiment, the number of shielding cover apertures is smaller than the number of antenna contact elements extending through the shielding cover.

Where antenna elements form dipoles, the antenna contact elements belonging to the same dipole may be fed through a common shielding cover contact element. The antenna contact elements do not touch the shielding cover.

In some embodiments, at least one antenna contact element extends outside the shielding frame in an area of the shielding frame. In some embodiments, this may be the case for more than one antenna contact element and in particular all antenna contact element of an antenna. For such embodiment, the proximal antenna contact element ends are located outside the area that is enclosed by the shielding frame.

In antenna modules with more than one antenna, the antenna contact elements of one antenna may extend into a space delimited by the shielding frame and the shielding cover as explained before, while the antenna contact elements of another antenna extends outside the shielding frame in an area of the shielding frame.

In some embodiments, the antenna module includes a support frame. The support frame is arranged inside the shielding frame in circumferential contact with the circumferential inner surface of the shielding frame. The support frame may be made from a dielectric respectively insulating material, e. g. plastics. The support frame may be arranged in a direction towards the proximal shielding frame end with respect to the shielding frame. In an assembled configuration, the support frame is arranged between the printed circuit board and the shielding cover. A proximal end of the support frame may be flush or substantially flush with the proximal shielding cover end respectively extend to the printed circuit board. A distal end of the support frame may serve as support and spacer for the shielding cover. In an assembled configuration, the components of the antenna interface circuit are located in the area that is circumferentially delimited by the support frame, respectively within the support frame.

In some embodiments with a support frame, the support frame includes a picking surface, thereby enabling the support frame and the shielding frame to be lifted in a pre-assembled state by applying a suction pressure. In such embodiment, the support frame and the shielding frame can be picked and placed as pre-assembled unit by way of vacuum in an assembly station. Therefore, the picking surface is sufficiently large to allow the application of a vacuum picking device as present from state-of-the-art assembly station present. The picking surface should favorably be planar to allow safe vacuum application. In an assembled configuration, the picking surface points in the distal direction. i. e. towards the distal shielding frame end.

The support frame should be designed to withstand the conditions occurring during soldering, in particular in a reflow soldering oven.

In some embodiments, the antenna module includes at least two antennas. The at least two antennas may be designed for operation at different frequencies. The at least two antennas may be of identical or different design. In other embodiments, the antenna module includes a single antenna or more than two antennas.

According to a further aspect, the overall objective is achieved via an antenna module as explained in the following. The antenna module may be an antenna module according to any embodiment as disclosed above and/or further below. The antenna module comprises a number of antennas, each antenna including a number of antenna elements and a number of elongated antenna contact elements. Each antenna contact element has a proximal antenna contact element end and an opposed distal antenna contact element end. The distal antenna contact element ends are each connected to at least one antenna element. The antenna contact elements are each configured to establish contact with an associated conductive path of a printed circuit board via a movement of the antennas and the printed circuit board towards each other. The antenna module further includes a shielding, the shielding including a shielding frame and a shielding cover. The shielding frame has a proximal shielding frame end and an opposed distal shielding frame end, wherein the proximal shielding frame end is configured for mounting on the printed circuit board under circumferential contact. The shielding frame is further configured to circumferentially enclose components of an antenna interface circuit arranged on the printed circuit board. The shielding cover is in circumferential contact with a circumferential surface of the shielding frame. The shielding cover comprises a number of shielding cover apertures and a number of antenna contact elements extends through the shielding cover apertures. While the shielding may carry the antenna or antennas as explained above and further below, this is not essential.

According to a further aspect, the overall objective is achieved by a high-frequency assembly. The high-frequency assembly includes a printed circuit board and a number of antenna modules according to any embodiment as discussed above and/or further below.

The high-frequency assembly further includes a number or antenna interface circuits arranged on the printed circuit board. The number of antenna interface circuits corresponds to the number of antenna modules. An antenna interface circuit includes the circuitry necessary for operating an antenna for transmitting and/or receiving radio-frequency signals, and may further include auxiliary circuitry. An antenna interface circuit may, for example, include digital signal processor, digital-to-analogue and analogue-to-digital converters, amplifiers, filters, multiplexers, transceivers, and the like.

Each of the shielding frames is arranged on the printed circuit board under circumferential contact with the printed circuit board and each of the shielding frames circumferentially encloses components of an antenna interface circuit.

In some embodiments, the high-frequency assembly further includes a number of printed circuit board contact elements, wherein each printed circuit board contact element is associated with an antenna contact element in a one-to-one manner. In some embodiments, an associated printed circuit board contact element is present for each antenna contact element of a number of antennas. The printed circuit board contact elements are arranged on and in contact with the printed circuit board. The printed circuit board contact elements are typically each mounted on an associated conductive contact area on the printed circuit board, with each contact area being electrically connected with an associated conductive path of the printed circuit board. Printed circuit board contact elements may be elastic or resilient, thereby providing a spring force as explained before.

In some embodiments of a high frequency assembly, the antenna modules and associated antenna interface circuits are arranged on the printed circuit board in a matrix arrangement. Bay way of example, the matrix may have total number of, for example, 32, 64 or 128 elements.

In some embodiments, each antenna contact element is connected in a one-to-one manner with an associated port of an antenna interface circuit. This type of embodiment allows individual control of each antenna element for the signal transmission and/or reception in particular with respect to amplitude and/or phase.

According to a further aspect, the overall objective is achieved by a method for assembling a high-frequency assembly according to any embodiment as discussed above and/or further below. The method includes (a) assembling the printed circuit board with components of the number of interface circuits and the number of shielding frames using soldering paste. The method further includes (b) reflow soldering the components of the number of antenna interface circuits and the number of shielding frames to the printed circuit board. The method further includes (c) connecting, for each antenna module, the shielding cover with the associated shielding frame. The method further includes (d) connecting, for each antenna module, the antenna contact elements with the associated conductive path of the printed circuit board via a relative movement of the antenna module and the printed circuit board towards each other.

The movements for connecting the antenna contact elements with the conductive paths may be a single common movement for all contact elements of an antenna and optionally for a number of antennas, in particular for all antennas of an antenna module.

In embodiments of antenna modules with a coupling member as explained before, one or more antennas may be connected with the coupling member in a step (d') before step (d), thereby forming an antenna subassembly. Step (d) may in this case be realized by moving the antenna subassembly and the printed circuit board towards each other.

Alternatively, the coupling member may be connected in step (d') to the shielding frame and/or shielding cover separately. In this case, step (d) may include connecting the antenna with the coupling member via the same motion.

The shielding cover may either be connected with the shielding frame in a separate step. Alternatively, the shielding frame is pre-assembled with a coupling member and is assembled together with the coupling member.

According to a further aspect, the overall objective is achieved by a method for transmitting and/or receiving high-frequency signals, using an antenna module and/or a high-frequency assembly according any embodiment as discussed above and/or further below.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

It is to be understood that directional expressions such as "top", "bottom", upper", "lower". "above", "below", "left", right" are used with reference to the figures and are only meant to aid the reader's understanding, without implying any particular orientations or directions in use. Further, the proximal direction and the distal direction as used throughout this document are indicated by "p" and "d" as applicable. A longitudinal axis is indicated by "A".

Figure 1:
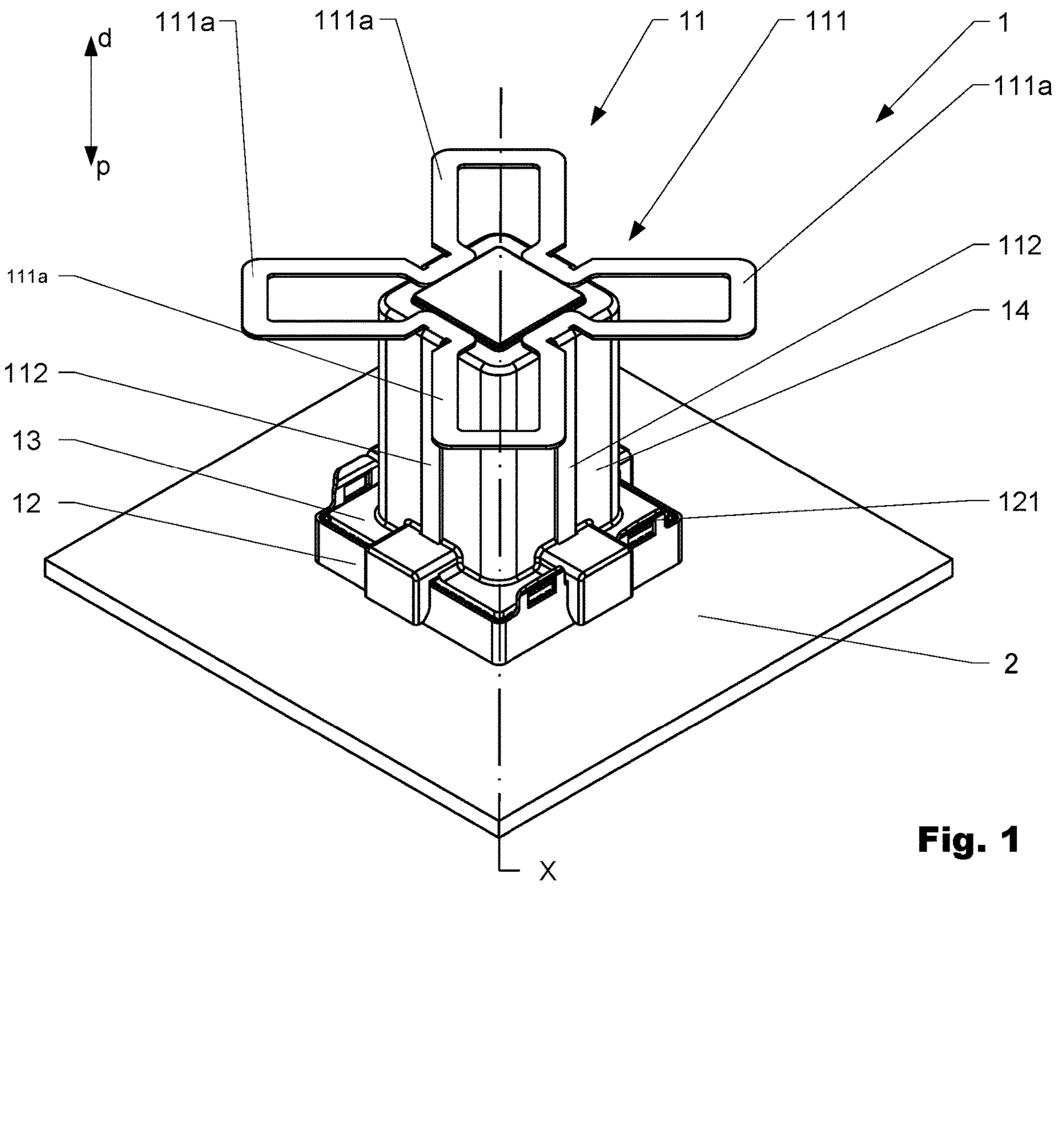
FIG. 1 shows a first exemplary antenna assembly in a schematic perspective view.
Figure 2:
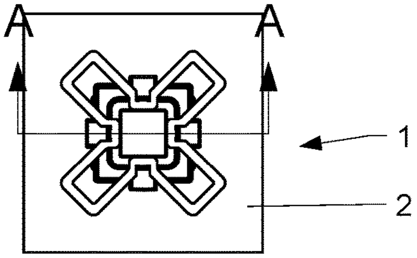
FIG. 2 shows the first exemplary antenna assembly in a top view.
Figure 3:
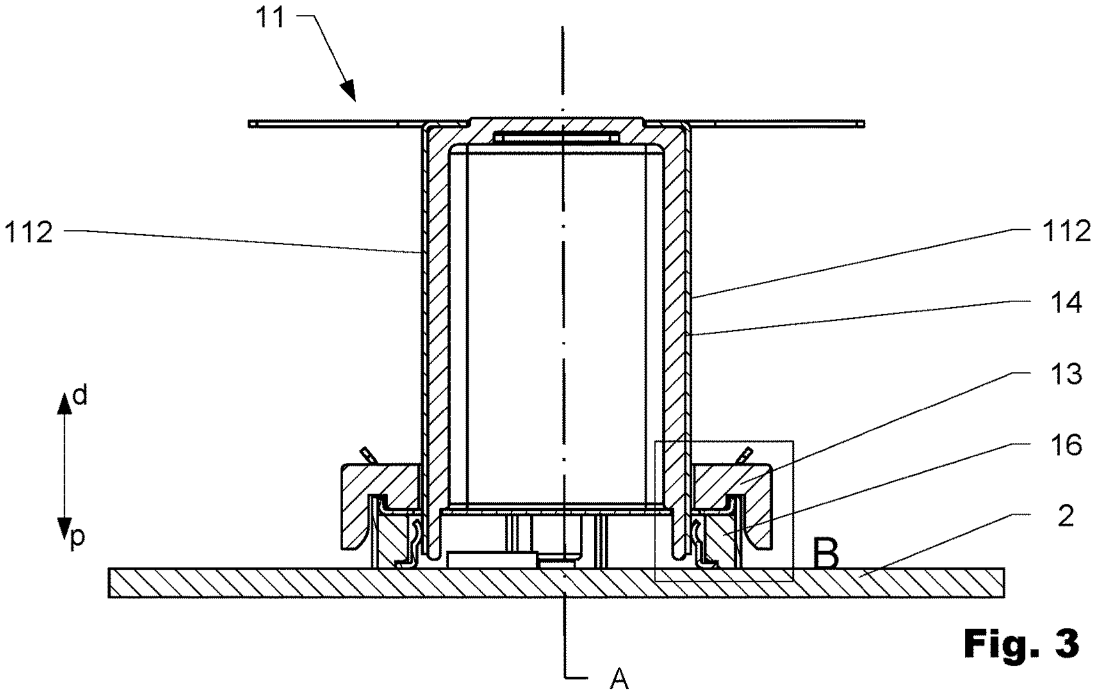
FIG. 3 shows the first exemplary antenna assembly in a longitudinal sectional view as indicated in FIG. 2.
Figure 4:
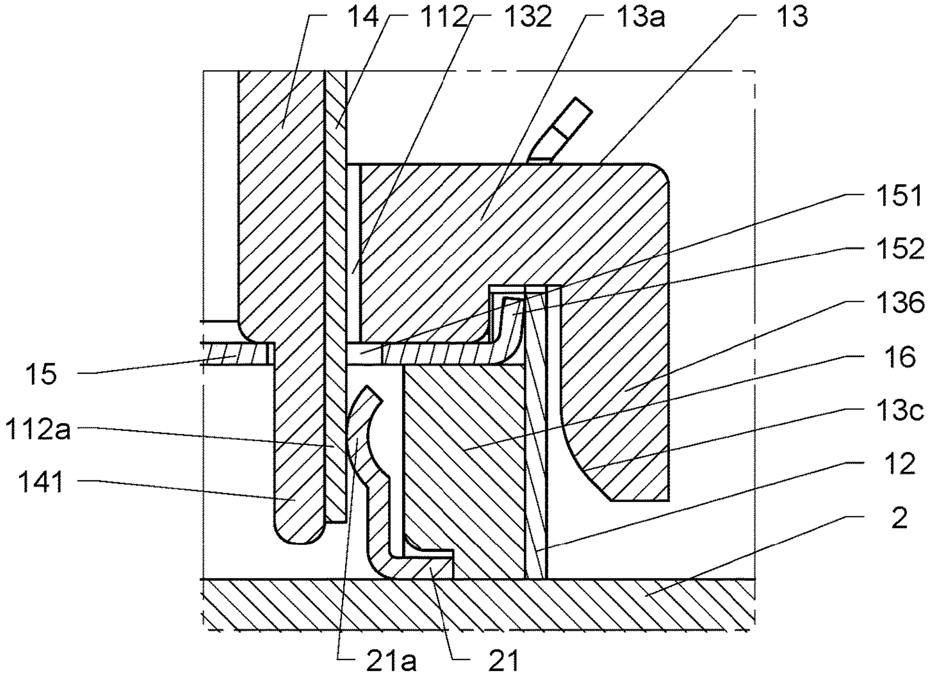
FIG. 4 shows a detail of FIG. 4 in an enlarged view.
Figure 5:
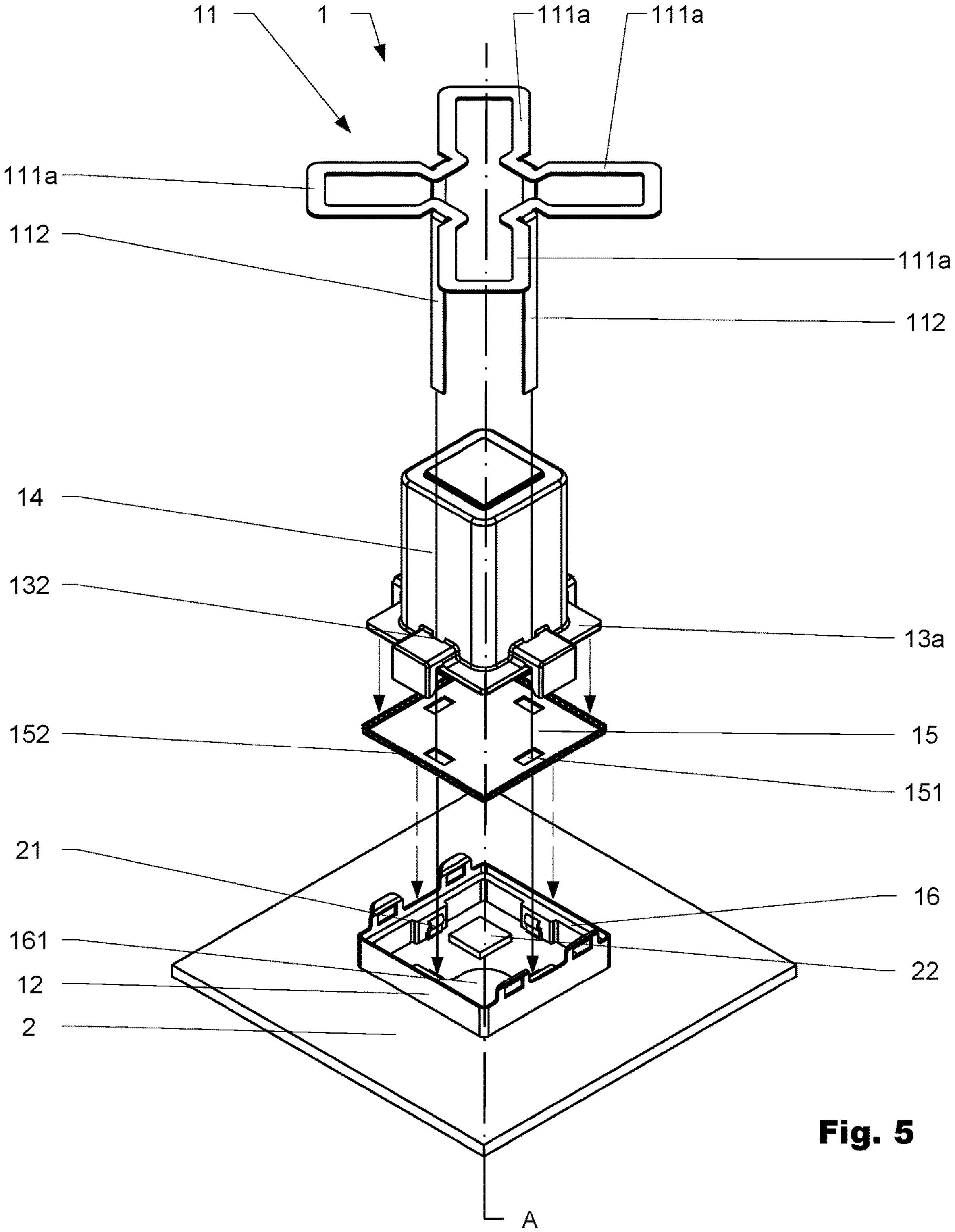
FIG. 5 shows the first exemplary antenna assembly in a partly exploded view.
Figure 6:
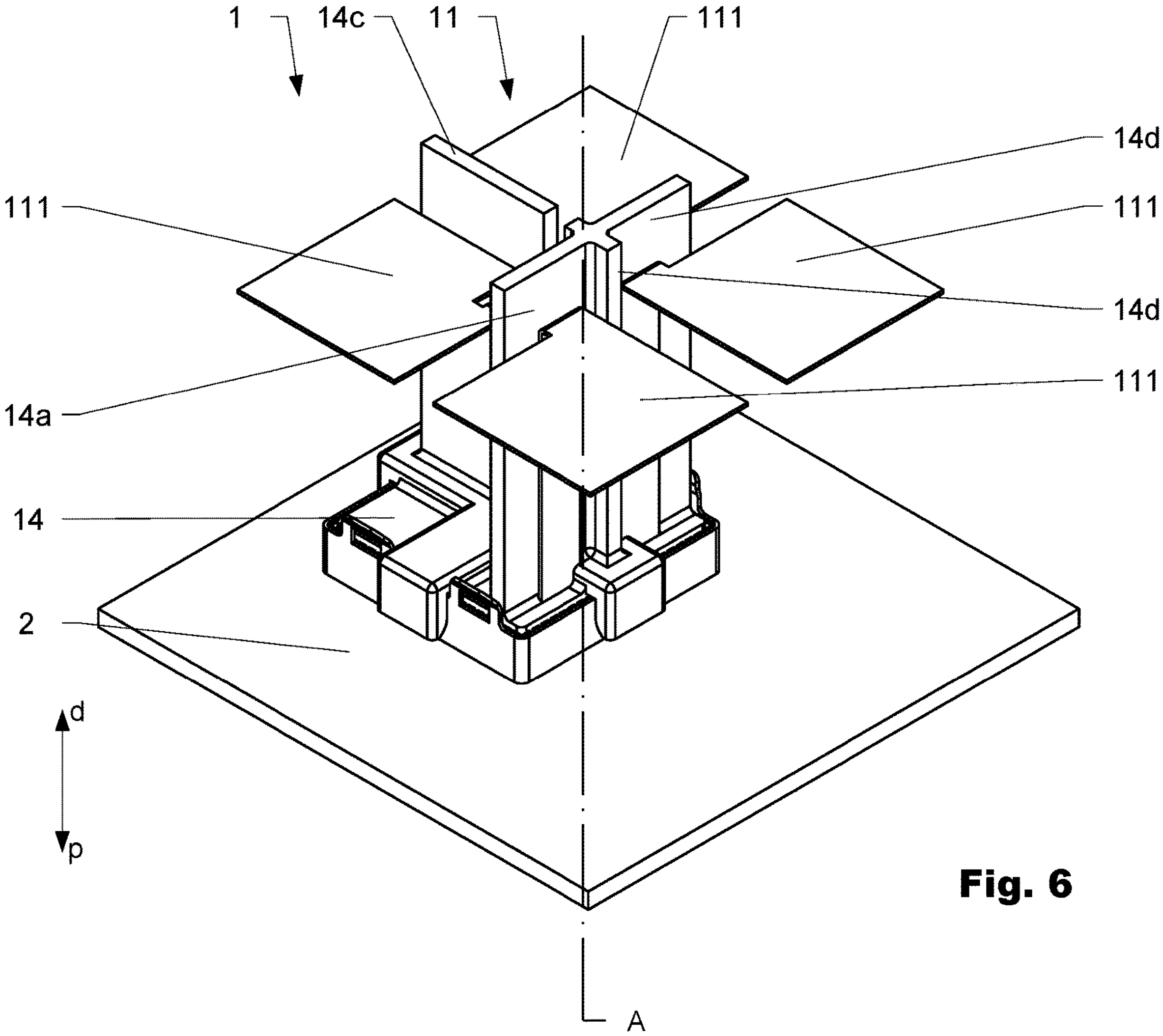
FIG. 6 shows a second exemplary antenna assembly in a schematic perspective view.
Figure 7:
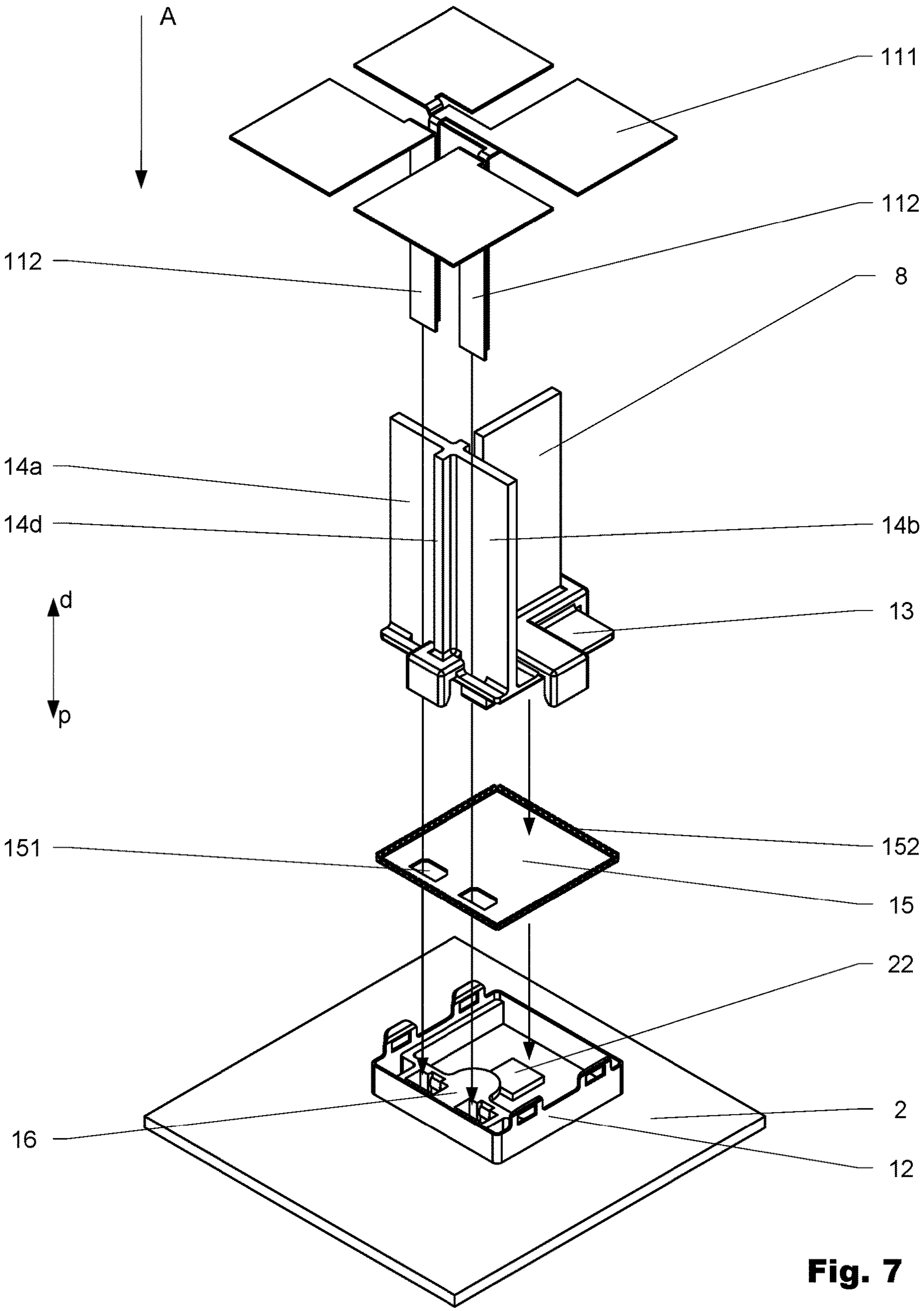
FIG. 7 shows the second exemplary antenna assembly in an exploded view.

FIG. 1 shows a first example of an antenna assembly with an antenna module 1 that is mounted on a printed circuit board 2 in a schematic perspective view, FIG. 2 shows the arrangement of FIG. 1 in a top view (from distal towards proximal), FIG. 3 shows a cross longitudinal cross sectional view, and FIG. 4 shows a detail of FIG. 3. FIG. 5 shows the arrangement of FIG. 1 in an exploded view.

In this first example, the antenna module 1 includes a single antenna 11 a single antenna element 111. That is, in this example, the number of antennas is 1 and the number of antenna elements is 1. In the shown design, the antenna element 111 is realized by four U-shaped antenna subelements 111*a* that are connected at the ends of their legs. Between each pair of adjacent legs, an antenna contact element 112 is arranged. The number of antenna contact elements is accordingly 4 in this example. While other configurations may also be used, the antenna 1 is controlled as two dipoles The antenna element 111 extends in a common plane that is arranged parallel and distal of printed circuit board (PCB) 2. In this example, the element 111 and the antenna contact elements 112 are realized in common as a press-bent sheet metal part. The antenna contact elements 112 extend in this example perpendicular from the antenna element 111 in proximal direction towards the PCB 2.

On the PCB 2, a shielding frame 2 is arranged under circumferential contact by circumferentially soldering the proximal end of the shielding frame 12 to a conductive ground (GND) plane of the PCB 2 as generally known in the art.

A coupling member 13 is received by the shielding frame 12 in a proximal section thereof. The coupling member 13 has an outer contour (footprint) generally corresponding to the inner contour shielding frame 12 (in this example substantially square). The coupling member 13 is made from plastic material in order to avoid short-circuits between the antenna contact elements 112 as will become more apparent further below.

The coupling member 13 and the shielding frame 12 are connected via exemplary 4 snap-fit connections. For this purpose, 4 elastic latch members 121 extend in distal direction from the distal shielding frame end. The latch members 121 are configured to engage with the coupling member 13 at its periphery. In this example, the engagement is releasable by deflecting the latch members 121 towards the outside, which, however is not essential.

Further in this embodiment, an antenna carrier 14 is provided and exemplarily formed integrally with the coupling member 13, which, however, is not essential. In this example, the antenna carrier 14 is generally tubular and has an exemplary substantially square cross section. The antenna carrier 14 extends from the coupling member 13 in distal direction and carries the antenna element 111 at its distal end. In this design, the antenna carrier 14 is arranged in a coaxial manner with the coupling member 13, with the coupling member 13 surrounding the antenna carrier 14 at its distal end as a circumferential protrusion or frame.

Further in this example, the antenna contact elements 112 extend from the antenna element 111 at the outer circumferential surface of the antenna carrier 114 towards the PCB 2.

As best visible in FIG. 3 and FIG. 4, the antenna contact elements 112 each extend via an associated coupling member aperture 132 in the proximal direction into the room inside the shielding frame, with the proximal antenna contact element ends 112*a* being located somewhat above the PCB 2. PCB contact elements 21 are soldered onto the PCB 2 in corresponding contact areas as counter-elements for the antenna contact elements 112. The PCB contact elements 21 couple the antenna contact elements 112 with the antenna interface circuit via (generally internal) conductive paths of the PCB 2. In this example, the PCB contact elements 21 are substantially L-shaped, with an exemplarily shorter leg being soldered to the PCB 2 and am exemplarily longer leg projecting in the distal direction. In this design, the projecting leg has an inwards-directed bulge 21*a* During the assembly as explained further below, the bulge 21*a* comes into contact with the associated antenna contact element 112 and is somewhat radially deflected outwards, thereby establishing a spring-biased contact with the antenna contact element 112 in the antenna contact element coupling area 112*b*. The antenna contact elements 112 are supported against the radial spring force by support projections 141.

As also best visible in FIG. 3 and FIG. 4, the coupling member 13 comprises in this embodiment an inwards-directed coupling member aperture 132 for each antenna contact element 112 through which the antenna contact element 112 projects together with its support projection 141. Laterally, the coupling member aperture 132 are arranged at the transition from the coupling member 13 to the antenna carrier 14, thereby allowing the antenna contact elements 112 to extend in a straight manner. The coupling member aperture 132 ensure correct positioning of the antenna contact elements 112.

As best visible in FIG. 4 and FIG. 5, a metallic shielding cover 15 is arranged inside the shielding frame 12 and in a proximal region thereof. The shielding cover 15 has an outer contour that generally corresponds to the inner contour of the shielding frame. At its periphery, the shielding cover 15 is segmented and bent, thereby providing a plurality of shielding cover springs 152 at the circumference of the shielding cover 15 and providing a circumferential contact with the shielding frame 12. The shielding cover 15 is accordingly connected with the GND potential via the shielding frame 12. In the assembled configuration, the peripheral edge of the shielding cover 15 with the shielding cover springs 152 is laterally located between the shielding frame 12 and the coupling member 13. The distal end of the shielding frame 12 and the bent peripheral edge of the shielding cover 15 are bridged by the coupling member protrusions 13*b* as explained further below.

Further, the shielding cover 15 comprises shielding frame apertures 151 that are aligned with the coupling member apertures 132, through which the antenna contact elements 112 and associated support projections 141 project.

The coupling member 13 comprise exemplary 4 coupling member protrusions 13*b* that are distributed around its circumference. The coupling member protrusions 13*b* extend laterally beyond a coupling member body 13*a* (circumferentially inside the shielding fame 12) beyond the shielding frame and downwards in proximal direction towards the PCB 2. At the proximal ends, the coupling member protrusions 13*b* have inwards-directed chamfered or beveled alignment surfaces 13*c*. In the assembly process as explained further below, the alignment surfaces 13*c* come into contact with the shielding frame 12 first, thereby positioning respectively aligning the coupling member 12 and further elements mounted thereto with respect to the shielding frame 12.

Further, a support frame 16 is provided inside the shielding frame 12 and in circumferential contact with the inner surface of the inner shielding frame 12. A proximal end of the support frame may be flush with the proximal end of the shielding frame 12, such that both the shielding frame 12 and the support frame 16 both contact the PCB 2. In the distal direction, the support frame 12 serves as support and stop for the shielding cover 15, and the shielding frame serves as support for the coupling member 13. In this way, the shielding frame 12, the shielding cover 15 and the coupling member 13 are correctly aligned with each other during the assembly process. The support frame 16 has inwards-directed recess or cutouts (not referenced) at its distal end that receive the legs of the PCB contact elements 21 which are paced on the PCB.

On its inside, the support frame 16 provides sufficient free space for the arrangement of the antenna interface circuit respectively its electronic components 22. However, the support frame 16 provides in particular at its distal side, sufficient surface to al-low picking via a suction cup or the like of an assembly station. In this way, the shielding frame 12 and the support frame 16 can be automated positioned and assembled to the PCB 2 via with well-established suction based pick-and place device of an assembly station. For this purpose, the support frame 16 favorably comprise one or more picking surfaces 161 at its distal side (see FIG. 4).

In the following, a favorable assembly process for the antenna assembly of the antenna assembly is described with particular reference to FIG. 5.

The PCB 2 is assembled with the required electronic component, contact elements etc. as generally known in the art. The electronic components are favorably surface mounted devices (exemplarily represented by electronic component 22) and placed on the PCB 2 and temporarily fixed using soldering paste. Along with the other components, the shielding frame 12 together with the support frame 16 and the PCB contact elements 21 are placed and fixed on the PCB 2 using soldering paste.

Subsequent to the PCB assembly, the components are, including the PCB contact elements 21 and the shielding frame 12, permanently fixed and electric contacted in a reflow soldering process as known in the art. All elements that are mounted to the PCB 2 are designed to withstand the conditions occurring during reflow soldering, in particular using an infra-red reflow soldering oven. Further, the components on the PCB 2 and the soldering paste are directly exposed to the radiation and heat since they are not covered by any further element during the soldering process.

Subsequently, the shielding cover 15 is assembled by placement in the assembly direction A.

Subsequently, the coupling member 13 with the integral antenna carrier 14 is assembled by placement in the assembly direction A. In its final position the coupling member 13 is locked in position via elastic latch members.

Subsequently, the antenna 11 is assembled by a movement in the assembly direction A. In doing so, the antenna contact elements 112 move along the circumference of the antenna carrier 14, with their proximal end regions each being finally fed through the associated coupling member apertures 132 and shielding cover aperture 151. In the final assembled position, the antenna contact element coupling areas 112*b* each contact the associated PCB contact element 21 via a spring-biased contact as explained before. In this example, the contacts are releasable by a movement in the opposite direction (against the assembly direction A). If desired, the contact may be designed to be non-releasable, e. g. via interlocking. Optionally, the antenna 11 may be permanently fixed, e. g. adhesively fixed, to the antenna carrier 14 and/or the coupling member 13.

In a variant, the antenna 11 is first assembled to the antenna carrier 14 and the coupling member 13, thereby forming an antenna module subassembly that is subsequently mounted to the shielding frame 12 and the PCB 2 via a movement in the assembly direction A as explained before.

In a further variant, the shielding cover 15 is not directly inserted into the shielding frame 12 but mounted to the coupling member 13 and assembled together with the position member as a common unit.

In the following, reference is additionally made to FIG. 6, FIG. 7 and FIGS. 13-15, showing a second example of an antenna assembly in an assembled view (FIGS. 6, 13-15) and exploded view (FIG. 7), respectively. As this embodiment is in some respects similar to the before-described embodiment, the following description is focused on the differences.

In this embodiment, 4 antenna elements 111 are present that are realized as plates, in particular square plates. Like in the before-described embodiment, however, the antenna elements 111 extend in a common plane parallel to the PCB 2. Diagonal antenna elements 111 form a dipole. In contrast to the first example, each antenna element and associated antenna contact element is a separate component. An antenna contact element 112 is associated with and connected to each antenna element 111 in a one-to-one manner.

In this embodiment, the antenna carrier 14 has the geometry of an (exemplarily asymmetric) cross or star with for legs 14*a*, 14*b*, 14*c*, 14*d* which that extend in the proximal-distal direction. As best visible in FIG. 7, the four antenna contact elements 112 are each connected to the associated antenna element 111 at an inner corner of the antenna elements. The antenna contact elements 112 are separated by the legs of the antenna carrier 14. Further, the antenna contact elements 112 of diagonal antenna elements 111 (belonging to a common dipole) are arranged parallel. One pair of antenna contact elements 112 runs on both sides of antenna carrier leg 14*a*, and the other pair of antenna contact elements 112 runs on both sides of opposed antenna carrier leg 14*b*. Consequently, coupling member apertures 132 are arranged in the coupling member 13 on both sides of the legs 14*a*. 14*b*.

Figure 14:
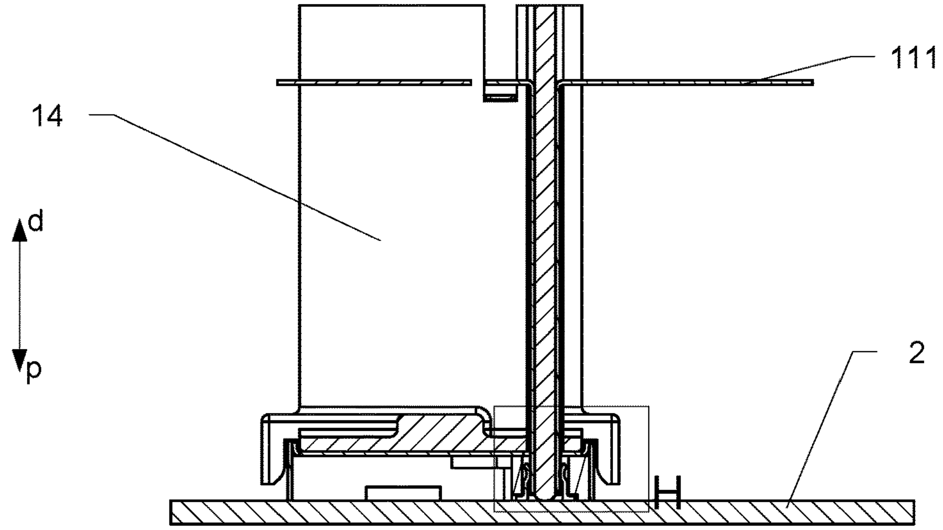
FIG. 14 shows the second exemplary antenna assembly in a longitudinal sectional view as indicated in FIG. 13.
Figure 15:
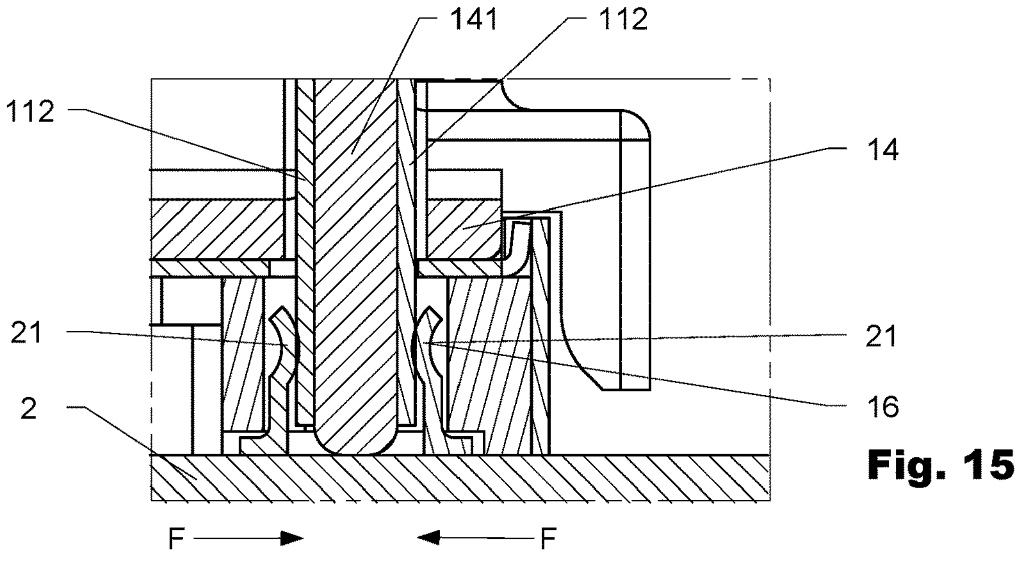
FIG. 15 shows a detail FIG. 14 in an enlarged view.

The contacting of the antenna contact elements 112 in the second example is best visible in FIG. 15, showing a detail of FIG. 14. In the second example, the PCB contact elements 21 are arranged pairwise opposite to each and spaced apart from each other, with the spring forces being directed towards each other.

In the following, reference is additionally made to FIGS. 8 to 12 and 16, showing a third example of an antenna assembly. This third example differs from the before-described examples in that the antenna module 1 comprises two antennas namely antenna 11 and further antenna 11'.

Figure 8:
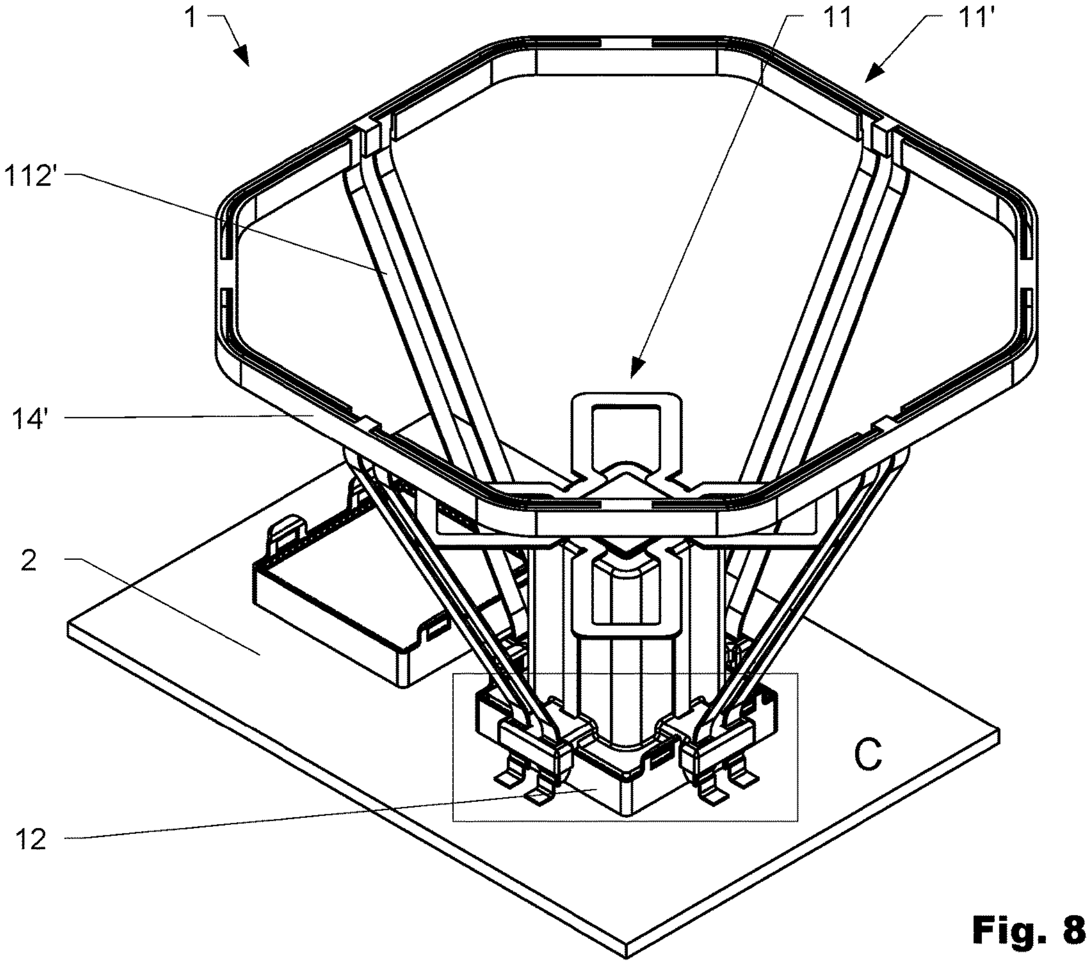
FIG. 8 shows a third exemplary antenna assembly in a schematic perspective view.
Figure 9:
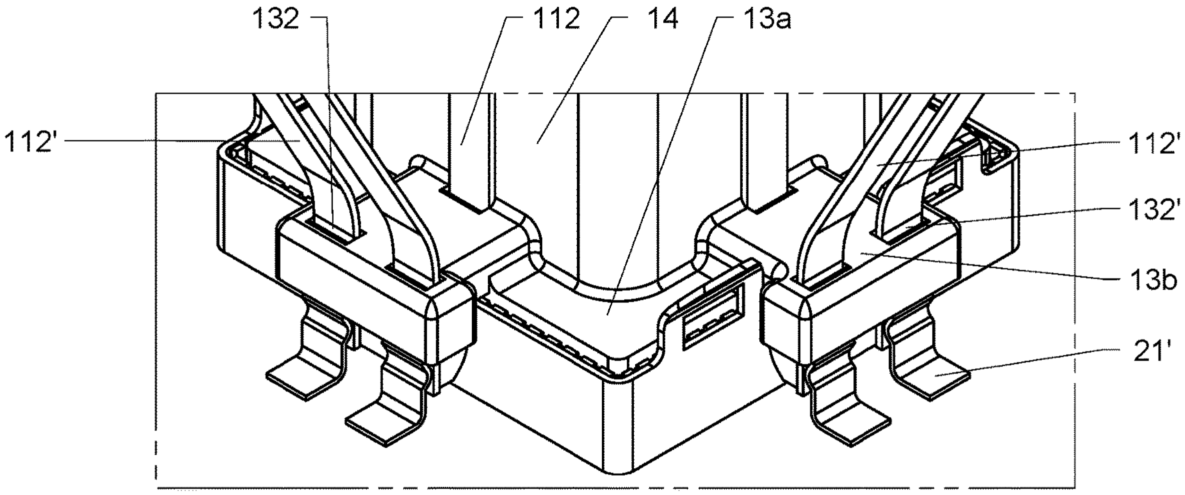
FIG. 9 shows a detail of FIG. 8 in an enlarged view
Figure 10:
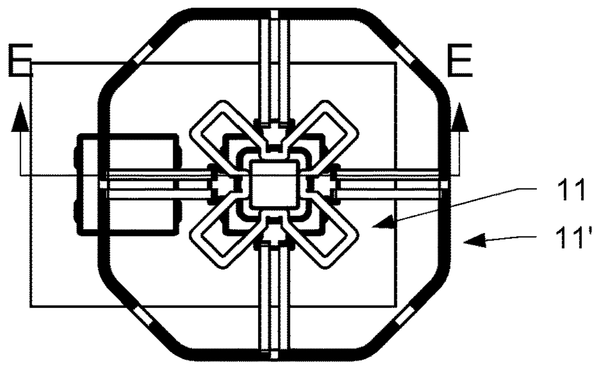
FIG. 10 shows the third exemplary antenna assembly in a top view.
Figure 11:
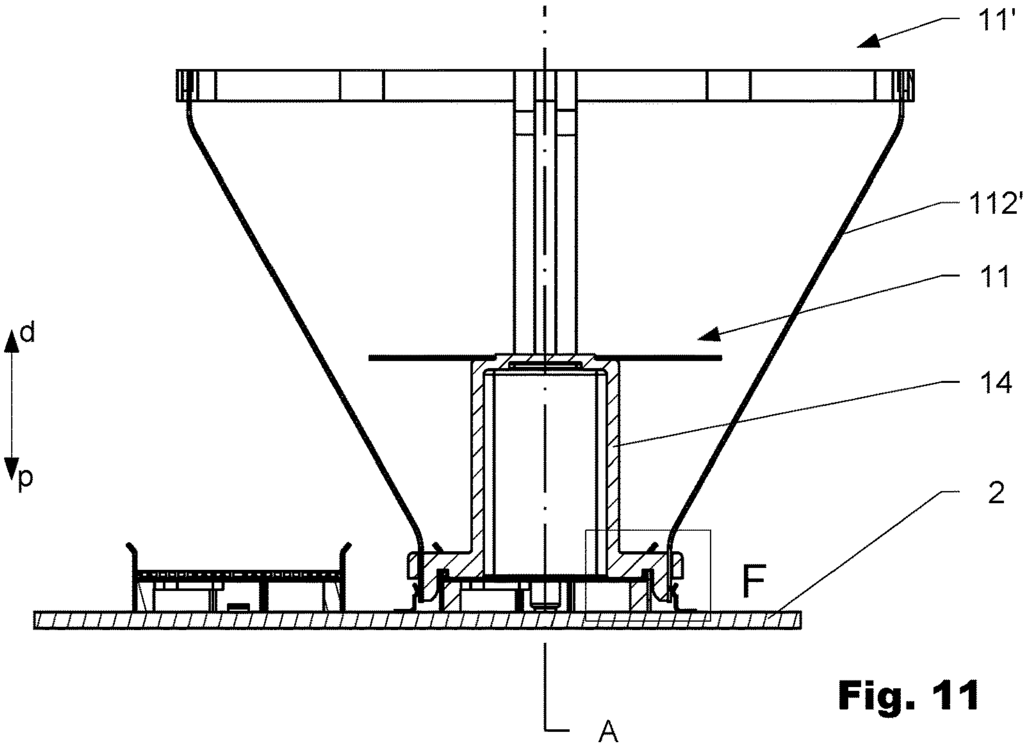
FIG. 11 shows the third exemplary antenna assembly in a longitudinal sectional view as indicated in FIG. 10.
Figure 12:
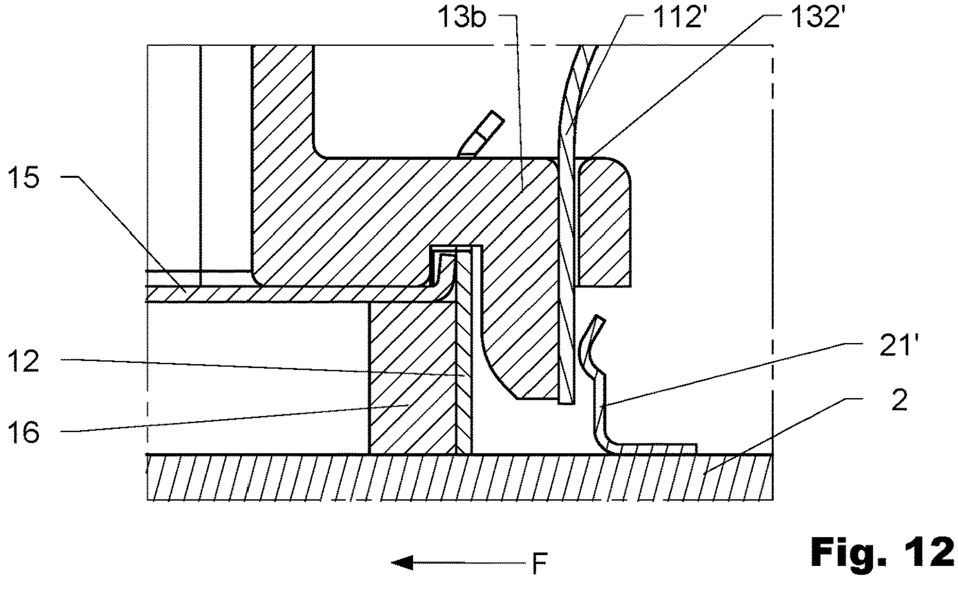
FIG. 12 shows a detail of FIG. 11 in an enlarged view.
Figure 13:
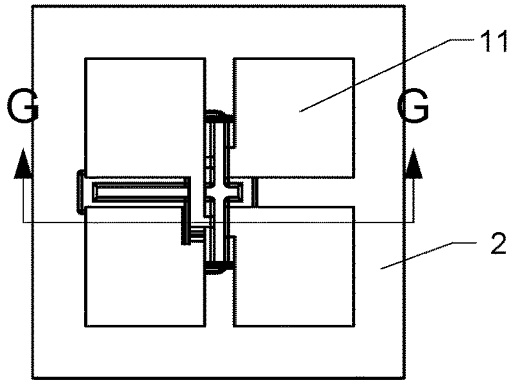
FIG. 13 shows the second exemplary antenna assembly in a top view.
Figure 16:
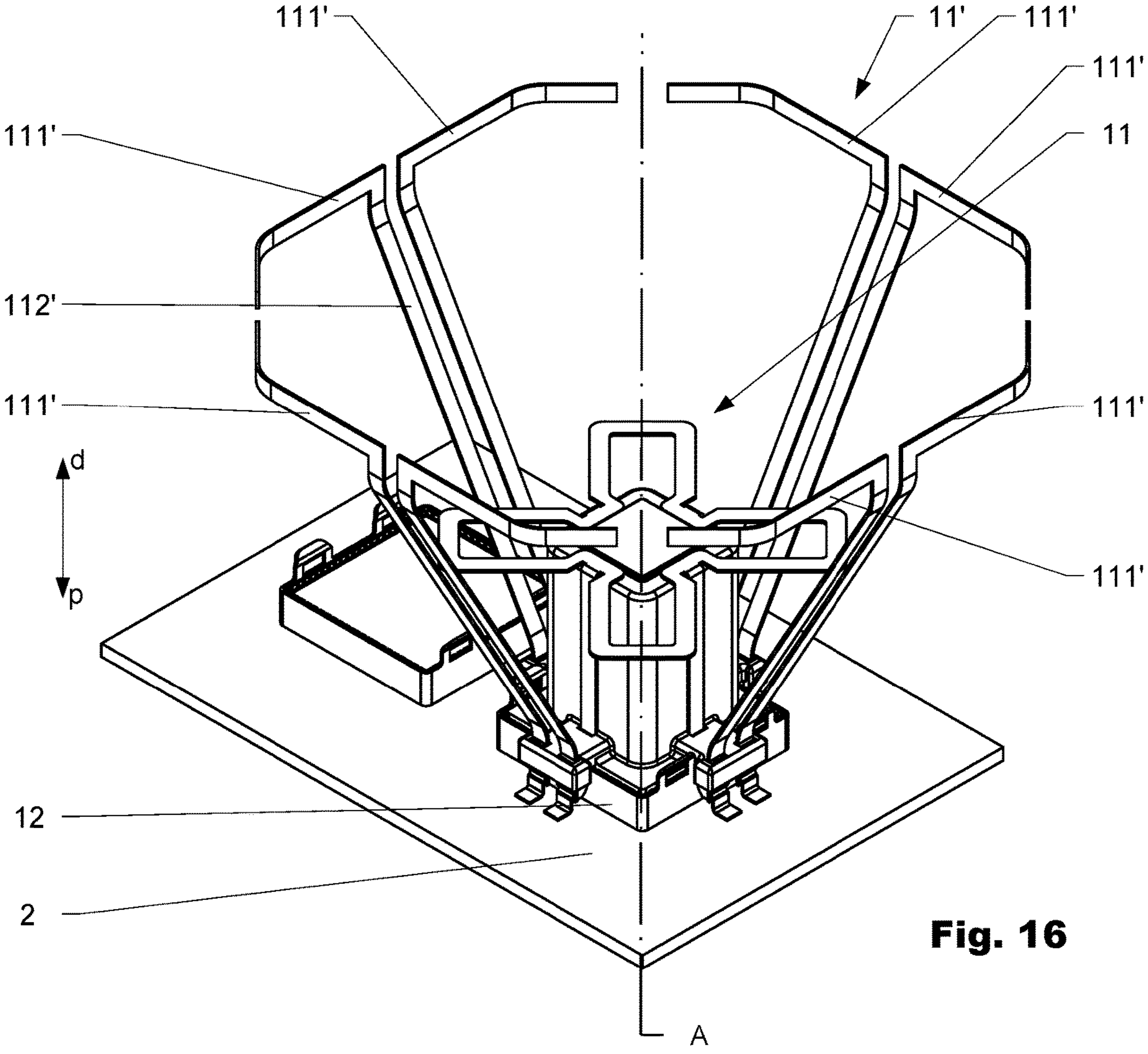
FIG. 16 corresponds to FIG. 8 with a component removed.

FIG. 8 shows the antenna assembly in a schematic perspective view and FIG. 10 shows a top view. FIG. 9 sows a detail C of FIG. 8. FIG. 11 shows a cross sectional view as indicated in FIG. 10. FIG. 12 shows a detail of FIG. 11. FIG. 16 generally corresponds to FIG. 8, with the element referenced 14' (antenna support) being removed.

The antenna 11 is designed in substantially the same way as in the first example. The following description is therefore mainly focused on the further antenna 11' which is set up as four dipoles with a total number of 8 further antenna elements 111'. The further antenna elements 111' are arranged as a ring in coaxial arrangement with the antenna elements 111 of the antenna 11 and spaced a larger distance apart from the PCB 2 as compared to the antenna 11.

As best visible from FIG. 16, a further antenna contact element 112' is connected to each further antenna element 111' and is realized with the latter as a common press-bent sheet metal part. As best seen in FIG. 8, a antenna support 14' is provided that is ring-shaped, corresponding to the outer contour formed by the further antenna elements 111'. The antenna support 14' is made from insulating plastic material and comprises a circumferential groove that receives the further antenna elements 111'.

Both the further antenna elements 111' as well as the antenna support 14' are supported and held in position by the further antenna contact elements 112'. The further antenna contact elements 112' extend in the proximal directions towards the PCB 2 and further inwards. Coupling of the further antenna contact elements 112' with the PCB 2 is established in proximity but outside of the shielding frame 12, as explained in the following with particular reference to FIG. 9 and FIG. 12. The position member 13 comprises in this example further coupling member apertures 132', corresponding to the further antenna contact elements 112'. The further coupling member apertures 132' are arranged in the coupling member protrusion **13*b* in an area outside of the shielding frame 12. Each proximal end section of a further antenna contact element 112' is fed through an associated further coupling member aperture 132'. The further antenna contact elements are contacted from the outside via a corresponding further PCB contact element 21'. The further PCB contact elements 21' are arranged such that their spring force F is directed inwards, towards the antenna contact element and the shielding frame 12. As best seen in FIG. 12, a proximal end section of the coupling member protrusion 13*b* serves as support for the further antenna contact element 112'** to absorb the spring force F.

The further PCB contact elements 21' are electrically connected with the antenna interface circuit inside the shielding frame 12 via inner conductor paths of the printed circuit board 2, the conductor paths crossing below the shielding frame 12.

Like in the before-described examples, each antenna element 111 and further antenna element 111' is favorably connected to a separate port of the antenna interface circuitry, typically a port of a high-frequency semiconductor component, and is individually controlled.

Figure 17:
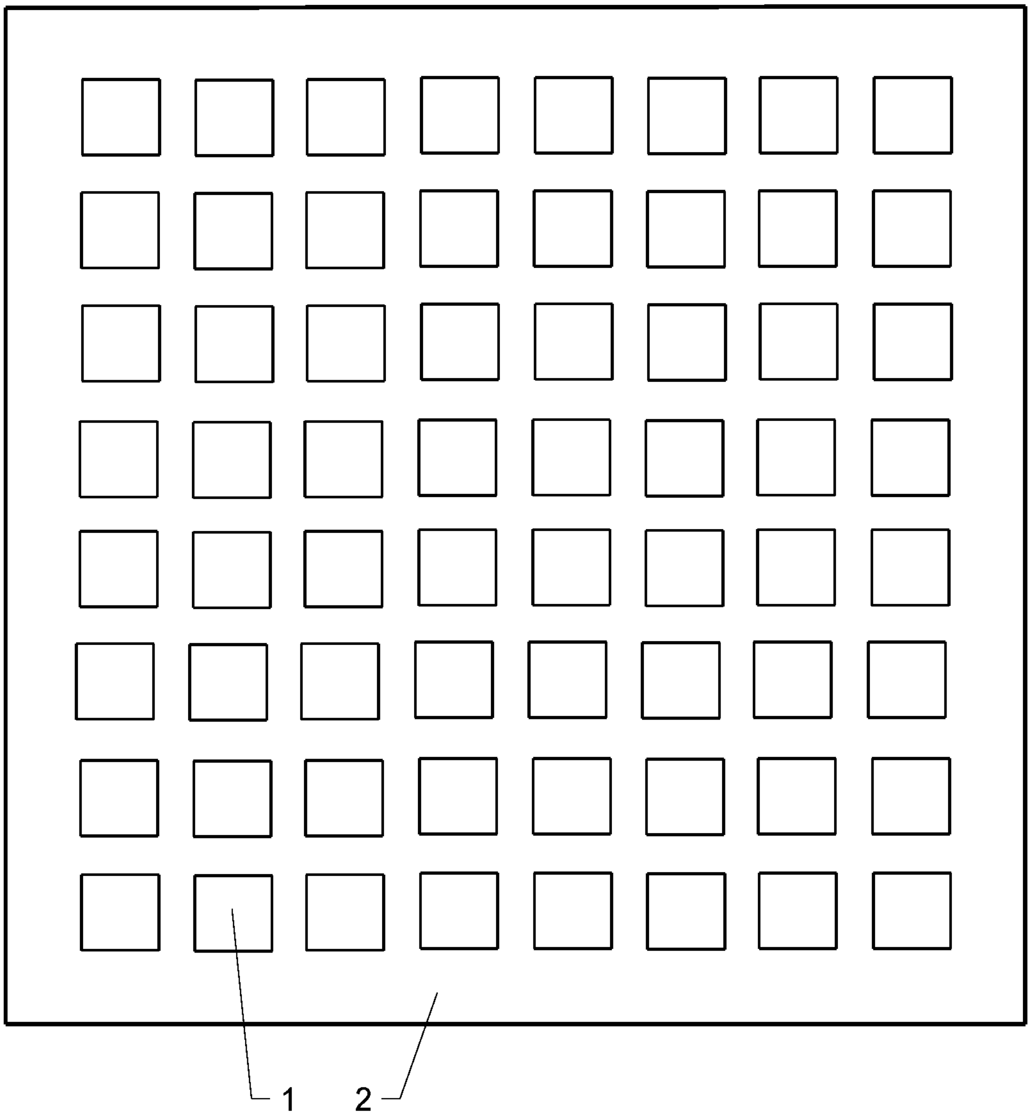
FIG. 17 shows a high-frequency assembly.

FIG. 17 shows a high-frequency assembly in a schematic top view. The high frequency assembly includes a number of antenna modules 1 that are commonly arranged on PCB 2 in a matrix arrangement. For exemplary purposes, FIG. 17 shows an arrangement 64 antenna modules 1 in an 8×8 matrix. The antenna modules 1 may be of the same or of different types and may be designed according to any embodiment in accordance with the present disclosure.

The invention claimed is:

1. An antenna module (1), comprising:

a) a number of antennas (11, 11'), each antenna (11, 11') including a number of antenna elements (111, 111') and a number of elongated antenna contact elements (112, 112');

wherein each antenna contact element (112, 112') has a proximal antenna contact element (**112*a***) end and an opposed distal antenna contact element end;

wherein the distal antenna contact element ends are each connected to at least one antenna element (111, 111');

wherein the antenna contact elements (112) are each configured to establish contact with an associated conductive path of a printed circuit board (2) by moving the antennas (11, 11') and the printed circuit board (2) towards each other;

b) a shielding, the shielding including a shielding frame (12) and a shielding cover (15), with the shielding frame (12) having a proximal shielding frame end and an opposed distal shielding frame end, wherein the proximal shielding frame end is configured for mounting on the printed circuit board (2) under circumferential contact and the shielding frame (12) is further configured to circumferentially enclose components of an antenna interface circuit (22) arranged on the printed circuit board (2);

the shielding cover (15) being in circumferential contact with the shielding frame (12);

the shielding carrying the number of antennas (11, 11').

2. The antenna module (1) according to claim 1, wherein at least one antenna contact element (112, 112') is formed integrally with an antenna element (111, 111').

3. The antenna module according to claim 1, wherein the antenna module (1) includes a coupling member (13), wherein the shielding frame (12) and/or the shielding cover (15) is connected to the coupling member (13), and the coupling member (13) is connected to the antennas (11, 11').

4. The antenna module (1) according to claim 3, wherein at least one antenna contact element (112, 112') is fed through an associated coupling member aperture (132, 132') of the coupling member (13).

5. The antenna module (1) according to claim 3, wherein the coupling member (13) is at least partly received by the shielding frame (12) at the distal shielding frame end and circumferentially surrounded by the shielding frame (12).

6. The antenna module (1) according to claim 5, wherein the shielding frame (12) and the coupling member (13) are connected via snap-fit.

7. The antenna module (1) according to claim 1, wherein the antenna module (1) includes an elongated antenna carrier (14), the antenna carrier (14) having a proximal antenna carrier end and an opposed distal antenna carrier end, the antenna carrier (14) extending from the shielding frame distal end and being connected to at least one antenna (11, 11') at the distal antenna carrier end.

8. The antenna module (1) according to claim 1, wherein a number of contact elements (112) extends through the shielding cover (15) into a space that is delimited by the shielding frame (12) and the shielding cover (15).

9. The antenna module (1) according to claim 8, wherein the shielding cover comprises a number of shielding cover apertures (151) and the number of antenna contact elements (112) extends through the shielding cover apertures (151).

10. The antenna module (1) according to claim 1, wherein a number of contact elements (112') extends outside the shielding frame (12) in an area of the shielding frame (12).

11. The antenna module (1) according to claim 1, the antenna module (1) including a support frame (16), the support frame (16) being arranged inside the shielding frame (12) in circumferential contact with the circumferential inner surface of the shielding frame (12).

12. The antenna module (1) according to claim 11, wherein the support frame (16) includes a picking surface (161), thereby enabling the support frame (16) and the shielding frame (12) to be lifted in a pre-assembled state by applying a suction pressure.

13. The antenna module (1) according to claim 1, wherein antenna module includes at least two antennas (11, 11'), the two antennas (11, 11') being designed for operation at different frequencies.

14. A high-frequency assembly, the high-frequency assembly including:

a) the printed circuit board (2);

b) a number of antenna modules (1) according to claim 1;

c) a number or antenna interface circuits (22) arranged on the printed circuit board (2), the number of antenna interface circuits (22) corresponding to the number of antenna modules (1);

wherein each of the shielding frames (15) is arranged on the printed circuit board (2) in circumferential contact with the printed circuit board (2) and each of the shielding frames (12) circumferentially encloses components of an antenna interface circuit (22), and wherein each antenna contact element (112, 112') separately contacts an associated conductive path of the printed circuit board (2).

15. The high-frequency assembly according to claim 14, wherein the antenna modules (1) and associated antenna interface circuits (22) are arranged on the printed circuit board in a matrix arrangement.

16. The high-frequency assembly according to claim 14, wherein each antenna contact element (111, 111') is connected in a one-to-one manner with an associated port of an antenna interface circuit (22).

17. A method for assembling a high-frequency assembly according to claim 14, the method including the steps of:

a) assembling the printed circuit board (2) with components of the number of interface circuits (22) and the number of shielding frames using soldering paste;

b) reflow soldering the components of the number of antenna interface circuits (22) and the number of shielding frames to the printed circuit board (2);

c) connecting, for each antenna module (1), the shielding cover (15) with the associated shielding frame (12);

d) connecting, for each antenna module (1), the antenna contact elements (112, 112') with the associated conductive path of the printed circuit board (2) via a relative movement of the antenna module (1) and the printed circuit board (2) towards each other.

18. A method for transmitting and/or receiving high-frequency signals, using an antenna module (1) according to claim 1.

* * * * *